(12) United States Patent
Freise

(10) Patent No.: US 10,577,001 B2
(45) Date of Patent: Mar. 3, 2020

(54) TRANSMITTER DEVICE, SENSOR DEVICE AND METHOD FOR SENSING A MAGNETIC FIELD CHANGE

(71) Applicant: SIEMENS AKTIENGESELLSCHAFT, München (DE)

(72) Inventor: Rainer Freise, Braunschweig (DE)

(73) Assignee: Siemens Mobility GmbH, Munich (DE)

( * ) Notice: Subject to any disclaimer, the term of this patent is extended or adjusted under 35 U.S.C. 154(b) by 0 days.

(21) Appl. No.: 16/312,452

(22) PCT Filed: Jun. 1, 2017

(86) PCT No.: PCT/EP2017/063261
§ 371 (c)(1),
(2) Date: Dec. 21, 2018

(87) PCT Pub. No.: WO2017/220306
PCT Pub. Date: Dec. 28, 2017

(65) Prior Publication Data
US 2019/0126954 A1    May 2, 2019

(30) Foreign Application Priority Data
Jun. 24, 2016    (DE) .......................... 10 2016 211 354

(51) Int. Cl.
*B61L 1/16*    (2006.01)
*G01P 13/04*    (2006.01)
*B61L 1/08*    (2006.01)

(52) U.S. Cl.
CPC ................. *B61L 1/165* (2013.01); *B61L 1/08* (2013.01); *B61L 1/167* (2013.01); *G01P 13/04* (2013.01)

(58) Field of Classification Search
CPC .... B61L 1/165; B61L 1/08; B61L 1/16; G01P 13/04; G08G 1/09; G01D 5/20
(Continued)

(56) References Cited

U.S. PATENT DOCUMENTS 5,493,291 A * 2/1996 Bruggemann ..... B60K 31/0058
340/8.1
2019/0152499 A1* 5/2019 Gornioczek .............. B61L 1/08
2019/0195658 A1* 6/2019 Psiuk .................... A63B 63/004

FOREIGN PATENT DOCUMENTS

DE    3223126 A1    12/1983
DE    3720576 A1    1/1989
(Continued)

OTHER PUBLICATIONS

Gottfried Hoffmann et al. The ZP 43 Electronic Counter point , 1987, pp. 1-27 English Translation.*
(Continued)

*Primary Examiner* — Hung T Nguyen
(74) *Attorney, Agent, or Firm* — Laurence Greenberg; Werner Stemer; Ralph Locher

(57) ABSTRACT

A transmitter device for a sensor device detects a magnetic field change caused by an object approaching or moving past the sensor device, in particular by a wheel of a rail vehicle. The transmitter device has at least two alternating-current-fed transmitter oscillating circuits. In order to implement error disclosure of the sensor device in a particularly simple manner, the at least two transmitter oscillating circuits are formed in such a way that the resonance frequencies thereof are different from each other. A sensor device and a method for detecting a magnetic field change are also provided.

5 Claims, 1 Drawing Sheet

(58) Field of Classification Search
USPC .................... 340/935, 941, 991, 992, 993
See application file for complete search history.

(56) References Cited

FOREIGN PATENT DOCUMENTS

| | | |
|---|---:|---|
| DE | 19709840 A1 | 9/1998 |
| DE | 102007023476 A1 | 11/2008 |
| DE | 102012212939 A1 | 1/2014 |
| DE | 102014207409 A1 | 10/2015 |
| EP | 0340660 A2 | 11/1989 |
| WO | 2008138858 A1 | 11/2008 |
| WO | 2008138860 A1 | 11/2008 |
| WO | 2015158538 A1 | 10/2015 |

OTHER PUBLICATIONS

Gottfried Hoffmann et al, "Der elektronische Achszaehlpunkt ZP 43", [The ZP 43 electronic axle counter] Signal & Draht, (Apr. 1, 1987), vol. 79, No. 4, pp. 91-96, XP001390401-English abstract on p. 96.

* cited by examiner

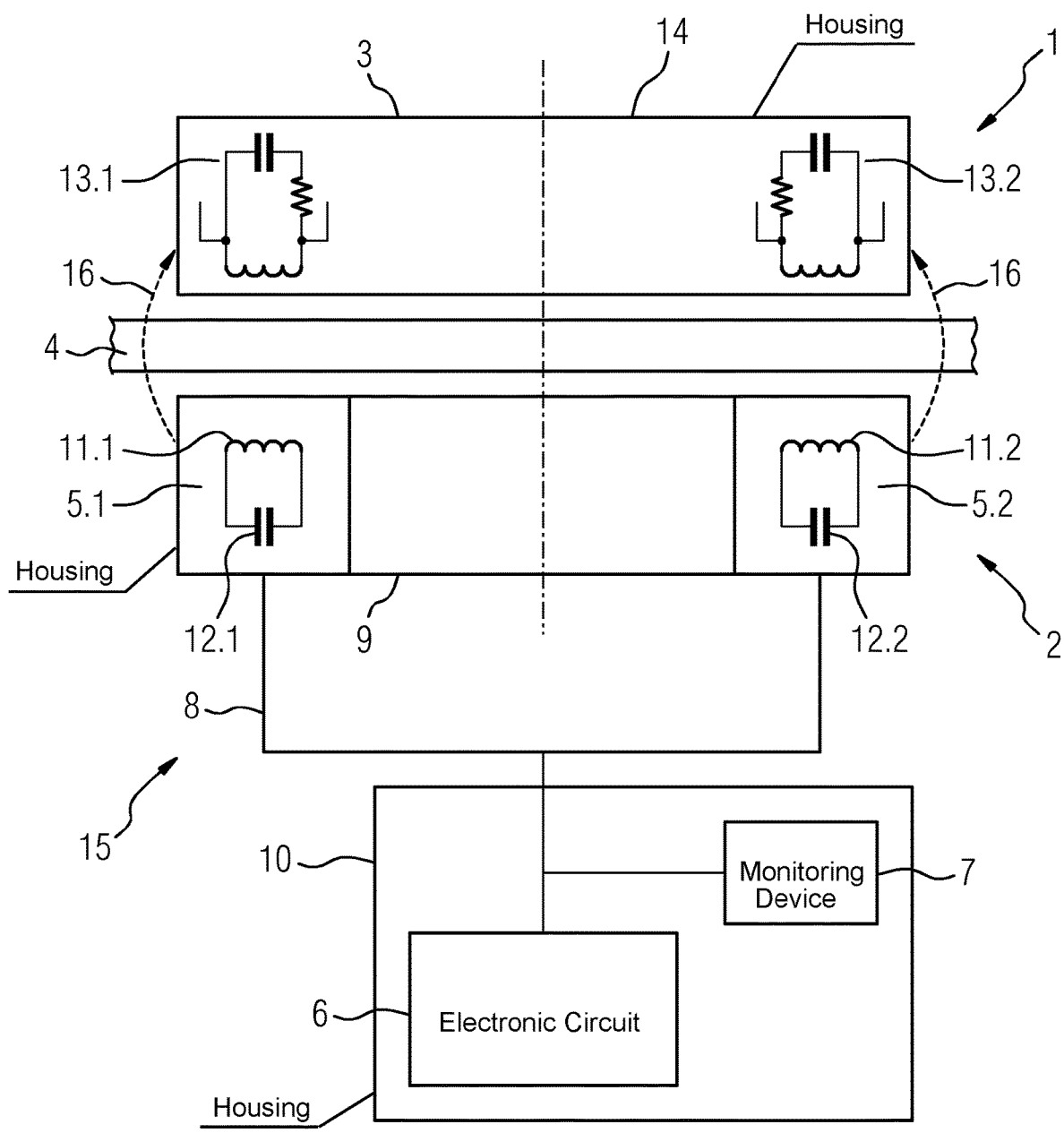

TRANSMITTER DEVICE, SENSOR DEVICE AND METHOD FOR SENSING A MAGNETIC FIELD CHANGE

BACKGROUND OF THE INVENTION

Field of the Invention

The invention relates to a transmitter device for a sensor device for detecting a magnetic field change caused by an object approaching or moving past the sensor device, in particular by a wheel of a rail vehicle, wherein the transmitter device has at least two alternating-current-fed transmitter oscillating circuits for forming a transmitter frequency of the transmitter device.

Furthermore, the invention relates to a method for detecting a magnetic field change which is caused by an object approaching or moving past the sensor device in the direction of movement of the sensor device, wherein a transmitter frequency of a transmitter device is formed by at least two alternating-current-fed transmitter oscillating circuits.

Transmitter devices and methods of the type mentioned are used in sensor devices, such as, for example wheel sensors or axle-counting contacts, to detect an approaching object or an object moving past. In railroad engineering systems this object moving past is, for example, the steel wheel of a rail vehicle. The object influences the magnetic field generated by the sensor device, so that the magnetic field change can be detected and is representative of an identification of the object. These sensor devices that operate according to the inductive principle of action are well known, for example in track release technology. There are embodiments here as one- or two-channel sensors, or those with a separate transmitter and receiver, which are each positioned oppositely on the rails, and those which have transmitters and receivers in a shared housing on the same rail side, for example on the rail inner side for wheel flange detection.

Two-channel sensor devices are conventionally used for identifying the direction of the rail vehicle moving past. When a wheel of the rail vehicle drives over the sensor device, with their oscillating circuits the two sensor channels create successively delayed signals which are used in an evaluation device for identifying the direction of travel. Known sensor devices are described, for example, in EP 0 340 660 A2, DE 10 2012 212 939 A1 or DE 10 2014 207 409 A1.

With transmitter devices of the type mentioned above with two transmitter oscillating circuits with only one frequency, the two transmitter oscillating circuits are conventionally connected in parallel. It must be ensured here that when a defect occurs, for example a component failure in one of the transmitter oscillating circuits or a wire breakage in the supply line, an unsafe state does not result. As a result of such a defect, the reception voltage of the channel that is not affected can change, and this potentially increases an insensitivity to objects moving past and would therefore be problematic in terms of safety. To prevent this, for example the reception voltage is monitored to be able to thus detect the fault. However, this is laborious and increases production costs.

SUMMARY OF THE INVENTION

It is the object of the present invention to provide a transmitter device and a method of the type mentioned in the introduction in which a failure disclosure is achieved in a simple manner.

The object is achieved by the inventive transmitter device of the type mentioned above, in that the at least two transmitter oscillating circuits are designed such that their resonance frequencies are different from each other.

The method mentioned in the introduction achieves the object in that the transmitter frequency is formed from at least two different resonance frequencies of the at least two transmitter oscillating circuits.

The inventive solution has the advantage that the transmitter frequency of the transmitter device changes when a defect or failure of a transmitter oscillating circuit occurs, for example due to a component failure or a wire breakage. This change in transmitter frequency can be easily detected, so safety-related responses can subsequently be implemented.

A further advantage of the inventive solution is that this it can be implemented particularly easily in terms of construction, namely by a corresponding configuration of the transmitter oscillating circuits, and this makes them particularly economical. Existing transmitter devices can also be particularly easily converted using the invention. Only the transmitter oscillating circuits have to be replaced. Advantageously no additional components are required in the transmitter oscillating circuits, which would generate costs and could optionally reduce the availability. Furthermore, the inventive solution can be implemented solely on the part of the transmitter device and as a result, for example, independently of a received signal level which can vary in the case of single-channel transmitter failure as a function of the mounting position on the rail and the rail type.

The inventive solution can be developed by advantageous embodiments which are described below.

Therefore, the at least two transmitter oscillating circuits can be formed such that their resonance frequencies are each formed outside a predetermined range of the transmitter frequency. This has the advantage that a fault, for example due to a wire breakage, can be detected particularly easily, because, for example, the predetermined range of the transmitter frequency with existing devices is already being monitored. As a result, the changes necessary to implement the invention are particularly small.

To form the transmitter device particularly easily, the transmitter device can have at least one oscillator circuit comprising the at least two transmitter oscillating circuits as frequency-determining elements, and in which the transmitter oscillating circuits are connected to one another in parallel.

In an advantageous embodiment the at least two transmitter oscillating circuits can have mutually different capacitances and/or inductances. This has the advantage that the invention can therefore be implemented particularly easily. Care should of course be taken when selecting the inductances and capacitances that the resonance frequencies resulting thereby are different.

For the inventive solution, a transmitter oscillating circuit could have a lower resonance frequency than the desired transmitter frequency and the other transmitter oscillating circuit can have a correspondingly higher resonance frequency than the desired transmitter frequency.

Due to the parallel connection of the transmitter oscillating circuit, the transmitter frequency of the oscillator circuit results as the mean of the two resonance frequencies.

The invention also relates to a sensor device for detecting a magnetic field change which is caused by an object approaching or moving past the sensor device, in particular by a wheel of a rail vehicle, wherein the sensor device has at least one transmitter device and at least one receiver device. According to the invention, the transmitter device is formed according to one of the above-described embodiments.

In an advantageous embodiment of the inventive sensor device the sensor device can have at least one monitoring device which is designed for determining the transmitter frequency of the transmitter device and for checking whether the determined transmitter frequency is in a predetermined frequency range. This has the advantage that the monitoring device easily determines a defect and the associated change in frequency of the transmitter frequency. A monitoring device of this kind can be part of the inventive transmitter device. Alternatively, the monitoring device can, however, also be part of the receiver device and can determine and monitor the transmitter frequency on the receiver side.

To optionally automatically trigger further necessary safety measures, the monitoring device can be designed for outputting a warning signal when the determined transmitter frequency is outside of the predetermined frequency range.

To be able to use the invention particularly advantageously for railroad engineering systems, the sensor device can be designed as a wheel sensor for detecting a magnetic field change which is caused by a wheel moving past the wheel sensor on a rail in a direction of movement along the longitudinal direction of the rail.

In an advantageous embodiment of the inventive method the at least two resonance frequencies can each be formed with a frequency outside a predetermined frequency range of the transmitter frequency. This has the advantage already described above that monitoring of the predetermined frequency range frequently already exists and can thereby be easily implemented.

To initiate further necessary safety measures in the case of a defect, the transmitter frequency can be determined and a warning signal generated when the determined transmitter frequency is outside the predetermined range.

BRIEF DESCRIPTION OF THE SEVERAL VIEWS OF THE DRAWING

The invention will be explained in the following with reference to the accompanying drawing.

The single FIGURE shows a schematic illustration of an exemplary embodiment of an inventive sensor device.

DESCRIPTION OF THE INVENTION

A sensor device 1 of the embodiment illustrated by way of example in the FIGURE comprises a transmitter device 2 and a receiver device 3. The sensor device 1 is arranged on both sides of a rail 4 which is part of a railroad engineering system (not shown) and is driven on by at least one rail vehicle (not shown) in a direction of movement along the longitudinal direction of the rail.

The transmitter device 2 has two transmitter oscillating circuits 5.1, 5.2 connected in parallel, an electronic circuit 6 and a monitoring device 7. These components of the sensor device 1 are electrically connected to each other by electrical connections 8, which are shown only simplistically in the FIGURE for reasons of clarity. In the sensor device 1 illustrated by way of example in the FIGURE the two transmitter oscillating circuits 5.1, 5.2 are arranged in a housing 9 and the electronic circuit 6 and the monitoring device 7 in a further housing 10. Of course, the transmitter device 2 could be also completely arranged in a shared housing. The transmitter oscillating circuits 5.1, 5.2 each have an inductance 11.1, 11.2, for example a coil, and a capacitance 12.1, 12.2, for example a capacitor. The transmitter oscillation circuits 5.1, 5.2 are designed as parallel oscillating circuits.

The receiver device 3 has two receiver oscillating circuits 13.1, 13.2, and an evaluation device (not shown). The receiver oscillating circuits 13.1, 13.2 are arranged in a housing 14 opposite the transmitter oscillating circuits 5.1, 5.2 on the other side of the rail 4. The receiver device 3 could alternatively have, for example, even just one receiver oscillating circuit 13.

The mode of operation of the inventive sensor device 1 is described below.

During operation, the electronic circuit 6 of the transmitter device 2 generates an alternating current with a transmitter frequency $f_s$ of, for example, 50 kHz. This alternating current feeds, via the electrical connections 8, the two transmitter oscillating circuits 5.1, 5.2 connected in parallel. According to the invention, the two transmitter oscillating circuits 5.1, 5.2 are configured so they have mutually different resonance frequencies $f_r$. The resonance frequencies $f_r$ are configured so they are each outside a predetermined range of 50 kHz+/−3 kHz. In the exemplary embodiment in the FIGURE, for example, the transmitter oscillating circuit 5.1 has a resonance frequency of 45 kHz and the transmitter oscillating circuit 5.2 a resonance frequency of 55 kHz. The two transmitter oscillating circuits 5.1, 5.2 and the electronic circuit 6 jointly form a self-oscillating oscillator circuit 15. Due to the parallel connection of the transmitter oscillating circuits 5.1, 5.2, the transmitter frequency $f_s$ is established as the mean of the mutually different resonance frequencies $f_r$ of the two transmitter oscillating circuits 5.1, 5.2. In the embodiment illustrated by way of example in the FIGURE the transmitter frequency $f_s$ is therefore 50 kHz. The transmitter frequency $f_s$ is an operating frequency of the transmitter device 2. During operation, the monitoring device 7 determines the transmitter frequency $f_s$ of the transmitter device 2 and checks whether the determined transmitter frequency $f_s$ is in the predetermined frequency range of 50 kHz+/−3 kHz here. If the determined transmitter frequency $f_S$ is outside the predetermined frequency range, the monitoring device 7 outputs a warning signal.

If in the inventive transmitter device 2 one of the transmitter oscillating circuits 5.1, 5.2 fails as a result of a fault, such as, for example a cable or wire breakage or a component failure, the transmitter frequency $f_s$ of the oscillator circuit 15 inevitably changes because it is now determined only by the one remaining transmitter oscillating circuit 5.1, 5.2. The one transmitter oscillating circuit 5.1, 5.2 pulls the transmitter frequency $f_s$ outside the predetermined range since the transmitter frequency $f_s$ now matches the resonance frequency $f_r$ of the remaining transmitter oscillating circuit 5.1, 5.2. This change in the transmitter frequency $f_s$ outside the predetermined range is detected by the monitoring device 7 and the corresponding warning signal indicates the fault in the transmitter device 2. The warning signal can, for example, be transmitted to a control center (not shown) of the railroad engineering system which initiates appropriate measures.

Due to the alternating current generated by the oscillator circuit 15 of the transmitter device 2, a magnetic field is generated which induces a current in the receiver oscillating circuits 13.1, 13.2 of the receiver device 3 by way of the magnetic coupling 16. An object moving past the rail 4, for example the wheel of a rail vehicle, influences this magnetic coupling 16, so the magnetic field change can be detected on the receiver side by the evaluation device (not shown) of the receiver device 3.

The transmitter device 2 and receiver device 3 are each designed in the exemplary embodiment of the FIGURE with two transmitter oscillating circuits 5.1, 5.2 and two receiver oscillating circuits 13.1, 13.2. Therefore, the sensor device 1 is also referred to as two-channel, with each transmitter oscillating circuit 5.1, 5.2 or receiver oscillating circuit 13.1, 13.2 forming one channel respectively. The inventive transmitter device 2 in the FIGURE has two channels but could of course also have more channels.

The invention claimed is:

1. A sensor device for detecting a magnetic field change caused by an object approaching or moving past the sensor device, the sensor device comprising:
   at least one transmitter device including at least two alternating-current-fed transmitter oscillating circuits for forming a transmitter frequency of said at least one transmitter device, said at least two transmitter oscillating circuits being constructed to have resonance frequencies being different than each other;
   at least one monitoring device for determining the transmitter frequency of said at least one transmitter device and for checking whether the determined transmitter frequency is in a predetermined frequency range; and
   at least one receiver device.

2. The sensor device according to claim 1, wherein the object is a wheel of a rail vehicle.

3. The sensor device according to claim 1, wherein said monitoring device is configured for outputting a warning signal when the determined transmitter frequency is outside the predetermined frequency range.

4. The sensor device according to claim 1, wherein the sensor device is a wheel sensor for detecting a magnetic field change caused by a wheel moving past the wheel sensor on a rail in a direction of movement along a longitudinal direction of the rail.

5. A method for detecting a magnetic field change caused by an object approaching or moving past a sensor device in a direction of movement of the sensor device, the method comprising the following steps:
   using at least two alternating-current-fed transmitter oscillating circuits to form a transmitter frequency of a transmitter device;
   forming the transmitter frequency from at least two different resonance frequencies of the at least two transmitter oscillating circuits;
   forming each of the at least two resonance frequencies with a frequency outside a predetermined frequency range of the transmitter frequency; and
   determining the transmitter frequency and generating a warning signal when the determined transmitter frequency is outside the predetermined range.

* * * * *